United States Patent [19]

Adams

[11] Patent Number: 4,630,449
[45] Date of Patent: Dec. 23, 1986

[54] MONITORING APPARATUS

[75] Inventor: William H. Adams, Auburn, N.Y.

[73] Assignee: Richards Technical Products, Inc., Syracuse, N.Y.

[21] Appl. No.: 730,086

[22] Filed: May 3, 1985

[51] Int. Cl.[4] ............................................. G01K 13/00
[52] U.S. Cl. ........................................ 62/130; 62/158; 340/585
[58] Field of Search ................. 62/129, 126, 125, 130, 62/158; 340/584, 585, 587, 588, 692; 116/140; 236/94

[56] References Cited

U.S. PATENT DOCUMENTS

| 3,510,860 | 5/1970 | Christman | 62/129 X |
| 4,216,775 | 8/1980 | Cottingham | 116/140 X |
| 4,283,921 | 8/1981 | Prosky | 62/130 X |

Primary Examiner—Harry Tanner
Attorney, Agent, or Firm—Bruns and Wall

[57] ABSTRACT

Monitoring apparatus for sensing the temperature within a refrigeration unit that experiences periodic defrosting cycles. The apparatus is capable of discerning the differences between a normal defrost cycle and system failure and provides a warning signal when a failure occurs.

19 Claims, 5 Drawing Figures

4,630,449

MONITORING APPARATUS

BACKGROUND OF THE INVENTION

This invention relates to a method and apparatus for monitoring the operation of a system and, in particular, to a monitor capable of recognizing the difference between a normal interruption in service and an interruption of greater duration that might result in a total failure in the operation of the system.

Many systems that are in use today are adapted to maintain a constant or uniform environmental level within specific system boundaries. Failure of the system usually results in some type of injury occurring to either the equipment or goods stored in the environment. An example of such a system is a food freezer as typically found in most of today's markets. As can be seen, if the temperature within the freezer is allowed to rise beyond some predetermined level for a prolonged period of time, the goods stored in the freezer can thaw and possibly spoil. However, most freezers in use today are adapted to automatically defrost twice daily with each cycle lasting approximately sixty minutes. It is therefore difficult to determine when the freezer is experiencing a normal defrost cycle and when it is experiencing a failure related interruption in service.

It is possible to overcome the difficulties associated with defrost cycles and the like by providing a temperature monitoring system that has a time delay circuit capable of temporarily disabling an associated warning device for a period of time equal to or slightly greater than the defrost period upon the detection of a rise in temperature. Accordingly, the alarm is not actuated until after the monitoring system has waited for a period of time at least equal to the duration of a defrost cycle. Although the time delay feature prevents the generation of false alarm signals when the equipment is experiencing a normal interruption in service, it can introduce other problems which are also difficult to deal with. One problem encountered in this regard lies in the fact that the user has no way of determining if the monitor has failed or if it is simply waiting for a delay period to end. Oftentimes, the inoperability of the monitor can go undetected for long periods of time during which the system being monitored is unprotected. A system failure during this time thus would not trigger the alarm and, as a consequence, the user could very well suffer a loss. Similarly, at the time of installation, the installer generally has no way of knowing if either the monitoring circuit or the alarm are operating correctly. To properly check the apparatus, the installer must minimally follow the device through one complete normal delay cycle. In any event, a good deal of time can be consumed before it is determined that the monitor is operating properly.

SUMMARY OF THE INVENTION

It is therefore an object of the present invention to improve devices for monitoring the operation of a system.

It is a further object of the present invention to provide a system monitor that is capable of alerting the user when the monitor detects a normal interruption in service and to sound a persistent alarm when it detects a potential system failure.

A further object of the present invention is to provide a monitoring system for use in association with a refrigeration system which is capable of recognizing the difference between a normal defrost cycle and a potentially more dangerous interruption of greater duration and providing the user with a clear indication either type of interruption is in progress.

Another object of the present invention is to provide a battery operated solid state monitoring and alarm system that has a long life and which is capable of recognizing the difference between a normal interruption cycle and an impending system failure.

These and other objects of the present invention are attained by means of an apparatus for monitoring a variable property within a system to determine when the system is experiencing a normal interruption cycle and producing a clear alarm when a potentially dangerous situation is detected.

BRIEF DESCRIPTION OF THE DRAWINGS

For a better understanding of these and other objects of the present invention, reference is had to the following detailed description of the invention which is to be read in conjunction with the accompanying drawings wherein.

DESCRIPTION OF THE INVENTION

Figure 1:
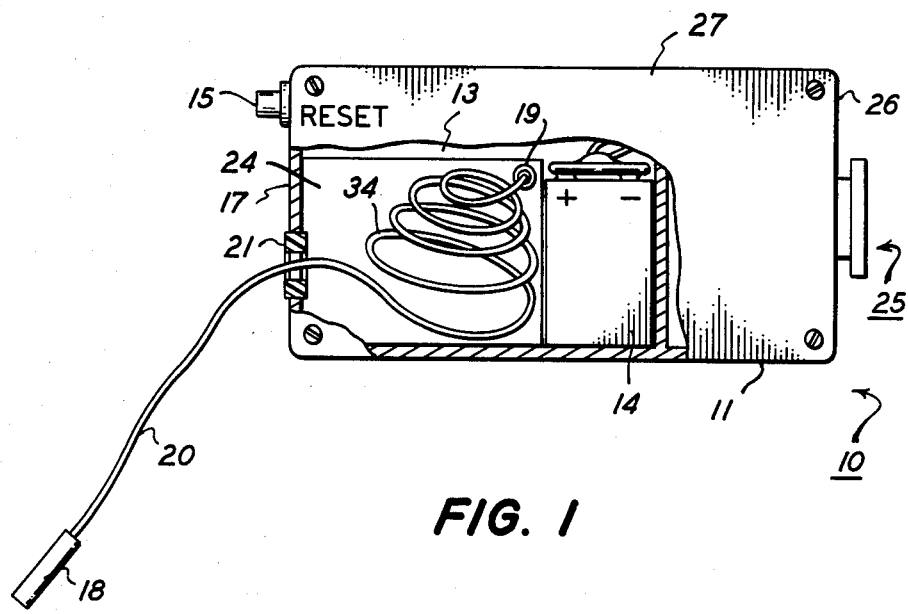
FIG. 1 is a side elevation of a monitoring device embodying the teachings of the present invention.

Turning now to FIG. 1, there is shown a compact housing 10 that houses a monitoring device embodying the teachings of the present invention. The monitoring device is adapted to sense a variable property, such as temperature, within a system that typically experiences periodic interruptions in service which affect the monitored property. As will be explained in greater detail below, upon detection of a change in the monitored property, a time delay circuit is enabled which holds an alarm in the circuitry inactive for a period of time that is at least equal to the duration of a normal interruption cycle. In the event the time delay period is exceeded without the monitored property returning to a desired level, an alarm is sounded which will persist until some appropriate action is taken by the user. During the period that a normal interruption cycle is in progress, a low level audio alert signal is generated which informs the user that the monitoring system is functioning correctly and that an interruption cycle is in progress.

The apparatus of the present invention will be explained in further detail with reference to a freezer (not shown) of the type generally used to store and display frozen goods in a market. As can be seen, any failure of service to the freezer will produce a rise in temperature that, if not corrected, will result in the goods being harmed. It should be apparent, however, to one skilled in the art, that the present apparatus could monitor a wide range of properties such as light, pressure, density or the like without departing from the teachings of the present invention.

The present unit 10 includes a slim, low profile case 11 that houses a printed circuit board 13 which can be encapsulated within a protective blanket to shield the electrical components from the surrounding atmosphere. The circuit board utilizes CMOS circuitry for all linear and digital functions and the circuits are designed to operate at a high impedance to minimize the drain on the battery. The circuitry also avoids the hazards, costs and complexities generally associated with AC powered devices. A standard nine volt battery 14 is utilized to power the unit. A reset button 15 is mounted upon the left hand sidewall 17 of case which, as seen in FIG. 1, when depressed triggers a chain of events which, among other things, leads to the generation of an audio signal verifying that the battery is in an operable condition. The reset button can also be used to reinitiate a monitoring cycle thereby permitting the test alarm signal to be silenced when the system being monitored is temporarily shut down for maintenance.

An extendible probe 18 is electrically connected to the circuit board via an input terminal 19. The probe is located at the distal end of wire lead 20 which is provided with sufficient length to permit the probe to be mounted at a remote location. The lead 20 is shielded along its entire length to prevent the reception of unwanted electrical noise. The lead passes out of a storage compartment 24 through a grommet 21 mounted in the sidewall 17. The wire lead 20 is normally stored in the compartment in a coil 34 as depicted at FIG. 1.

An audio outlet 25 is mounted in the opposing sidewall 26 of the case which, as will be explained in greater detail below, transmits two distinct audio signals to the surrounding ambient atmosphere. When a normal periodic interruption of service is detected, a first low level alert signal that sounds like a tick is transmitted while detection of a potentially dangerous interruption in service will cause a second louder alarm signal to be generated that is a discontinuous beeping sound. The front wall of the case is formed by a removable panel 27 that allows access to the interior housing thereof.

The case of the monitor unit can be mounted conveniently, yet inconspicuously, upon the outside of the freezer units. The probe is then extended by simply pulling the shielded wire out of the case and is positioned within the freezer preferably in a region where cooling air from the refrigerator enters the storage compartment. Both the probe and the lead wire are protected so that they are not adversely affected by condensation or moisture normally found in the freezer. Any unused lead not required in the mounting of the probe is simply pushed back into the storage compartment 24 through the grommet 21.

Figure 2A:
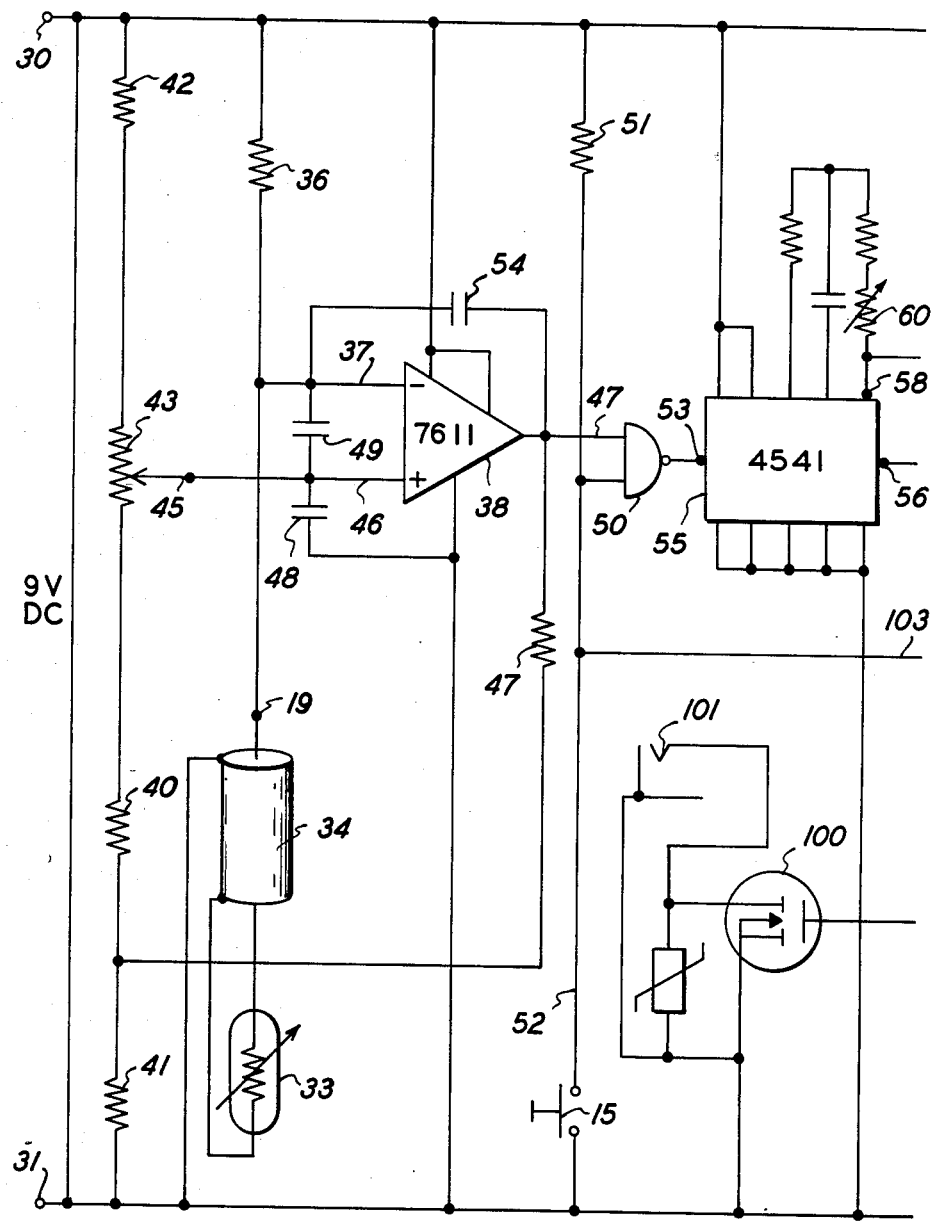
FIG. 2 consists of FIGS. 2a and 2b that are orientated as shown and which together illustrate a circuit diagram of the monitoring device of the present invention illustrated in FIG. 1.
Figure 2B:
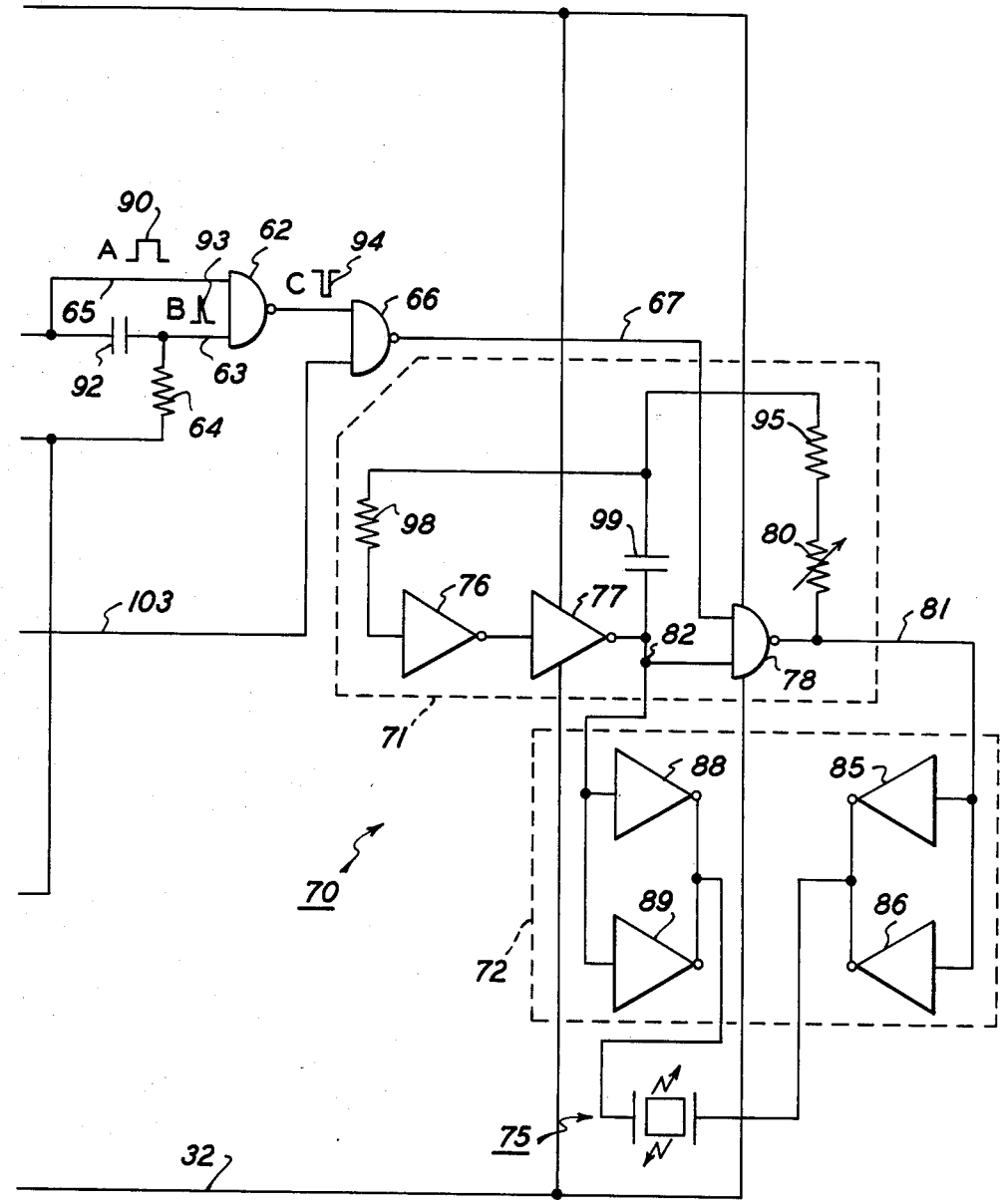

Turning now to FIG. 2, input terminals 30 and 31 are connected over the nine volt battery 14 (FIG. 1) so that line 32 serves as the system ground in regard to the monitor circuits. A thermistor 33 is contained within the probe 18 and is connected through lead wire 20, which is shown schematically at 34 in FIG. 2, to the circuit board via terminal 19. Thermistor 33 and resistor 36 form a first voltage divider network in the input 37 of comparator 38. A second voltage divider network is provided to the other input 46 of the comparator by resistors 40 and 41, along with resistor 42 and potentiometer 43. The output of the potentiometer is used to compensate for component tolerances to to give a desired setpoint temperature setting. The two input voltages are compared by comparator 38, which is an operational amplifier used as a comparator. Resistors 47 and 41 also constitute a voltage divider that creates a small amount of positive feedback around the comparator so that it cannot remain in an intermediate output state for lengthy periods of time. Capacitors 48 and 49 bypass to circuit ground any electrical noise which may be present while capacitor 54 causes the comparator to act also as an integrator to further reject electrical interference and very brief temperature excursions. The voltage at the output line 47 follows the sensed temperature and is high when the temperature exceeds the desired setpoint and is low during normal operations.

In the event the temperature in the freezer rises above the desired operating level, the normally low output of the comparator 38 will go high thereby placing an enabling signal upon input 47 of NAND gate 50. Resistor 51 and the reset button 15 are connected via line 52 to the other input of the NAND gate 50. The reset button is normally held in an open condition so that the gate, under normal operating conditions, acts as an inverter to place the low-going signal to the reset input pin 53 of a downstream counter/timer 55. The counter/timer acts as a timing device in the present circuit. As long as the input at the reset pin 53 remains high, the counter will be quiescent and the output at pin 56 will remain low. This represents the normal operating condition of the monitor which prevails when the sensed freezer temperature is at or below the threshold temperature set into comparator 38. Upon sensing a rise in temperature, the input to reset pin 53 goes low thereby triggering an oscillator within the counter/timer circuit 55 which begins running at a predetermined rate. The oscillator acts as a basic timer and provides a pulse output at line 58. A counter is also contained in the circuit and serves to expand the relatively short time intervals generated by the oscillator timer and provides a second output at line 56. The timer is enabled by a continuous low signal applied to pin 53. When pin 53 goes high the oscillator is inhibited and the counter is forced to zero state. When 53 is low the oscillator will run continuously and the counter counts the oscillator pulses. Upon reaching its set point, the counter output goes high and remains high indefinitely ignoring the output of the oscillator. When the reset again goes high, the counter output goes low and the oscillator stops.

In this particular embodiment of the invention, the count is preset at 4,096. Through means of adjustable resistor 60, the period of the counter is set at 1.0254 seconds. As a result, once the count has started a time interval of 70 minutes (4096 pulses×1.0254 seconds=4,200 seconds) will pass before the output 56 of the timer 55 goes high. A 70 minute interval is used in this particular embodiment or application of the invention in order to accommodate a normal defrost cycle used in most freezers. The normal cycle generally has a duration of approximately 60 minutes. For devices normally experiencing shorter interruption cycles, the delay interval set into the counter can be made shorter by simply adjusting the resistor 60 as noted above. Longer interrupt cycles can be similarly accommodated.

The high going output of the counter is applied to one input 63 of a NAND gate 62 through a blocking resistor 64. The output of the oscillator at pin 58 is applied directly to the second input 65 of the gate to enable the gate each time a timing pulse is generated. The output of the oscillator is also applied to the first gate input 63 through means of a capacitor 92. When the output of the oscillator at point 58 goes positive, gate 62 is enabled via 65. At this time, line 63 or gate 62, which is maintained at ground potential by resistor 64 and the still quiescent counter output 56, is immediately driven positive by capacitor 92. The simultaneous positive voltages at lines 63 and 65 cause the output of the gate 62 to go to 0 volts.

Capacitor 92 now charges through resistor 64 causing point 63 to once again approach 0 volts. As point 63 passes through the switching threshold voltage, which is about one half the supply voltage, of gate 62. The output of gate 62 returns to its original positive state as depicted by wave form 94. The duration of the signal is determined by the RC time constant of capacitor 92 and resistor 64. This generates an audible sound only for the very brief leading edge portions of the pulses 90.

When the preset count is reached, indicating that the temperature in the freezer has remained high for a period of time greater than a normal defrost cycle, the gate 62 is enabled and the oscillator automatically shuts down to hold the gate enabled. The output of the counter now goes high and high output is applied to the enabled gate. The counter output signal is inverted and passed by the gate to a second NAND gate 66 which also functions as an inverter to place an intermittent positive going signal upon the input line 67 of the system's circuit depicted generally at 70. This signal is similar to that occurring during the counting interval except that it has a duty cycle close to 50% while the duty cycle of the signal generated during counting has a much smaller duty cycle that is limited by the time constant noted above.

The alarm circuit includes a gated oscillator 71, a push-pull parallel drive 72 and a resonant piezoelectric audio transducer 75. The gate oscillator includes two inverters 76 and 77 that are connected in series with a NAND gate 78 to form a classic three inverter CMOS oscillator circuit. The output frequency of the oscillator is adjusted by variable resistor 80 so that the output of the oscillator matches the operating frequency of the audio-transducer.

When enabled by a positive going signal on line 67, the gated oscillator generates two square waves of opposite polarity which are applied to push-pull drive 72. Before being enabled, both gate 78 and line 82 are positive. Enabling the gate causes line 81 to go negative. Point 82 now goes negative when gate 78 changes state after which lines 81 and 82 continue to alternate state, that is, one is positive when the other is negative. The drive is connected in a push-pull configuration via inverters 85-89 to an audio transducer 75 so that the peak to peak voltage signal provided by the transducer is double the power supply. When the preset count has been exceeded, the gated oscillator runs intermittently until the counter is reset. Accordingly, during this period the transducer will produce an extremely loud audio-alarm that persists until the reset button is depressed.

Figure 3:
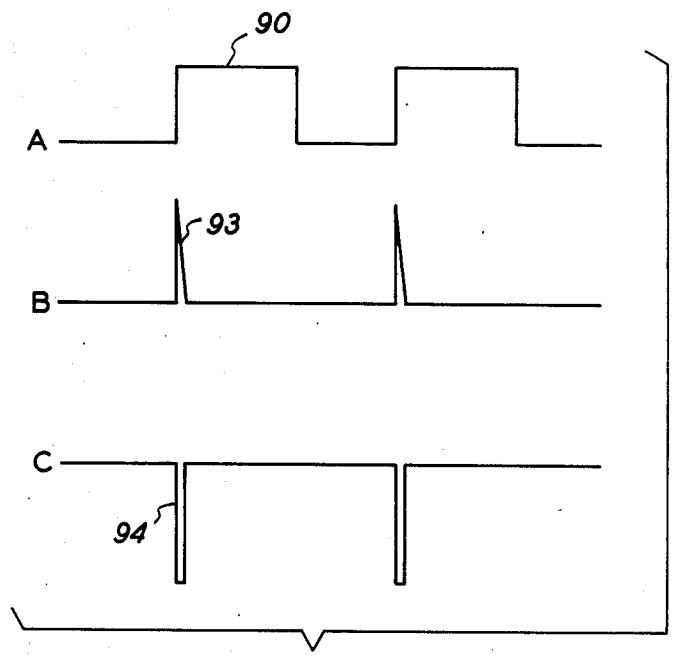
FIG. 3 is a time related diagram showing a series of electrical wave forms taken at a specific point relating to the circuit shown in FIG. 2.

As noted above, when the counter is operating, a continual stream of positive going timing pulses are applied to both inputs 63 and 65 of the NAND gate 62. The positive going timing pulse depicted at 90 in FIGS. 2 and 3 is used to enable the gate. As previously noted, capacitor 92, when charged through resistor 64, causes point 63 to approach 0 volts. As point 63 passes the threshold, the output at 62 returns to a positive state. The capacitor and resistor 64 form a time constant circuit that shapes the capacitor discharge pulse into a spike pulse as depicted at 93. This in turn drives the gate positive for a few dozen microseconds to produce a negative going output signal 94 of equally short duration. As can be seen, the gate will output an extremely narrow pulse each time the counter initiates a timing pulse. The output of the gate is inverted at gate 66 and applied to the input of the alarm circuit gated oscillator 71.

The time duration of that portion of each timing pulse passed by the gate 62 during a normal interruption cycle is significantly short. The time constant of this RC circuit, which is made up of resistor 98, a combination of resistances 80 and 95 and capacitor 99, is relatively long, however, and thus prevents the positive going square wave generated at the output of inverter 77 from reaching the positive side of the drive 72. As a result, only one side of the drive is energized by the oscillator during a normal interruption cycle and then only for a very short period of time. As a consequence, the audio-transducer is energized in repeated short cycles when the counter is running. Because of the brevity of each energization cycle and the reduction in drive power, the transducer produces a series of low level clicks or beeps that are easily discernable when compared to the intermittent loud alarm which is generated when a potentially dangerous condition is recognized by the monitoring circuit. The present monitor is thus adapted to produce two distinguishable audio signals using the same alarm and a minimum amount of circuitry. The first is a low level "alert" signal indicating that a failure in the system may have occurred or is likely to occur. It should be noted that in the event the freezer is restored to the desired operation temperature during the delay cycle, the comparator will reset the counter/timer automatically and the system will stand by in a ready condition for the next interruption cycle. When the alarm sounds, however, the user must take some affirmative action before the alarm terminates thus insuring that notice of the situation is given to the user.

In the event the preset count is reached, indicating that a true failure may have occurred, the output on the counter is also applied to the input gate of an N-channel power field effect transistor 100 turning the transistor on. Jack 101 may be used to connect the device to any remote type of signaling device. The transistor acts as a solid state switch in the circuit having a capacity of 1 amp at up to 20 volts D.C. As can be seen, the remote signaling device is turned on only after a potentially dangerous situation has been recognized by the present monitoring device. The jack, for example, can be tied to a second remote alarm system capable of providing warning at a remote station when the premises in which the freezer is located are empty, such as at night or on holidays.

The previously noted reset button 15 is placed in the input circuit to the NAND gate 50. Depressing the reset button applies a reset signal to the input pin 53 of the counter/timer 55 regardless of the state of comparator 38. This also places a signal directly upon the NAND gate 66 via lead 103 thereby enabling the gate and causing the audio transducer alarm to sound so long as the reset button is held depressed. This gives clear indication that the battery is in an operable condition. In addition, it also reinstates the counting cycle of the counter 55 so that a new count is started. In this manner, the alarm may be silenced while malfunctions at the freezer are being corrected.

While this invention has been described with reference to the structure disclosed herein, it is not confined to the details set forth and this application is intended to cover any modifications or changes as may come within the scope of the following claims.

I claim:

1. Apparatus for moditoring the temperature inside a refrigeration unit that experiences periodic defrost cycles of a known duration, said apparatus including a temperature sensor located within the refrigeration unit for providing an electrical output signal indicative of the temperature level inside the unit, a comparator means for comparing the sensor output signal level with a preset signal level and providing a first output signal when the sensed temperature level is above the preset level and a second output signal when the sensed temperature level is below the preset level, a timer means connected to the output of the comparator means which is enabled when the comparator means produces said first output signal whereby the timer means generates a continuous chain of timing pulses and is disabled when the comparator means produces said second output signal, counter means being coupled to the timer means for counting the number of pulses generated by the timer means and producing a counter output signal when a preset count is reached, the duration of the counter means cycle being greater than the duration of the defrost cycle, and an audio means coupled to the output of both the timer means and the counter means and including an audio transducer means providing a first audible alert signal any time the timer means is enabled and a second audible alarm signal when the counter means reaches the preset count, said audio means including time constant circuit means for actuating said audio transducer means for leading edge portions of said pulses to produce audible ticks as said first audible alert signal, and gating means enabled by said counter output signal for actuating said audio transducer means to produce an audible tone as said second audible alarm signal.

2. The apparatus of claim 1 wherein said temperature sensor is a thermistor mounted within a probe.

3. The apparatus of claim 1 wherein said audio transducer is coupled to the timer means and the counter means by the gating means that is arranged to activate the transducer for short intervals when the timer means is enabled and for longer intervals when the counter means reaches the preset count.

4. The apparatus of claim 1 having means for resetting the counter means automatically to zero when the timer means is disabled.

5. The apparatus of claim 1 that further includes an electronic switch coupled to the output of the counter means which is closed when the preset count is reached and a remote alarm means coupled to the output of the counter means by said electronic switch.

6. The apparatus of claim 1 that further includes a manually operated reset switch arranged to disable the timer means and reset the counter means when said switch is cycled.

7. The apparatus of claim 1 that further includes an adjustable means for selectively regulating the preset signal level provided to the comparator means.

8. Apparatus for monitoring a variable parameter inside an enclosed unit that experiences periodic cycles of a known duration during which time the variable parameter will change, said apparatus including a sensor located within the enclosed unit for providing an electrical output signal indicative of the parameter level inside the unit, a comparator means for comparing the sensor output signal level with a preset signal level and providing a first output signal when the sensed parameter level is above the preset level and a second output signal when the sensed parameter level is below the preset level, a timer means connected to the output of the comparator means which is enabled when the comparator means produces said first output signal whereby the timer means generates a continuous chain of timing pulses and is disabled when the comparator produces said second output signal, counter means being coupled to the timer means for counting the number of pulses generated by the timer means and producing a counter output signal when a preset count is reached, the duration of the counter means cycle being greater than the duration of the periodic cycle, and an audio means coupled to the output of both the timer means and the counter means and including an audio transducer means providing a first audible alert signal any time the timer means is enabled and second audible alarm signal when the counter means reaches the preset count, said audio means including time constant circuit means for actuating said audio transducer means for leading edge portions of said pulses to produce audible ticks as said first audible alert signal, and logic means enabled by said counter output signal for actuating said audio transducer means to produce an audible tone as said second audible alarm signal.

9. The apparatus of claim 8 having means for resetting the counter means automatically to zero when the timer means is disabled.

10. The apparatus of claim 8 that further includes an electronic switch coupled to the output of the counter means which is closed when the preset count is reached and a remote alarm means coupled to the output of the counter means by said electronic switch.

11. The apparatus of claim 8 that further includes a manually operated reset switch arranged to disable the timer means and reset the counter means when said switch is cycled.

12. The apparatus of claim 8 that further includes an adjustable means for selectively regulating the preset signal level provided to the comparator means.

13. Apparatus for monitoring the temperature inside a refrigeration unit that experiences periodic defrost cycles of a known duration, said apparatus including a temperature sensor located within the refrigeration unit for providing an electrical output signal indicative of the temperature level inside the unit, a comparator means for comparing the sensor output signal level with a preset signal level and providing a first output signal when the sensed temperature level is above the preset level and a second output signal when the sensed temperature level is below the preset level, a timer means connected to the output of the comparator means which is enabled when the comparator means produces said. first output signal whereby the timer means generates a continuous chain of timing pulses and is disabled when the comparator means produces said second output signal, counter means being coupled to the timer means for counting the number of pulses generated by the timer means and producing a counter output signal when a preset count is reached, the duration of the counter means cycle being greater than the duration of the defrost cycle, an audio means coupled to the output of both the timer means and the counter means and including an audio transducer means providing a first audible alert signal any time the timer means is enabled and a second audible alarm signal when the counter means reaches the preset count, and reset means including automatic reset circuit means for automatically resetting the counter means to zero and disabling the timer means when the sensed temperature level falls to or below said preset level before said preset count is reached thus terminating said first audible alert signal, and manual reset circuit means having a manual reset switch and holding circuit means for holding said audio means on to produce said second audible alarm signal once said preset has been reached, notwithstanding a return of said sensed temperature level to or below said preset level, until said manual reset switch has been actuated.

14. The apparatus of claim 13 wherein said audio means is an audio transducer that is coupled to the timer means and the counter means by a gating means that is arranged to activate the transducer for short intervals when the timer means is enabled and for longer intervals when the counter means reaches the preset count.

15. The apparatus of claim 13 wherein said reset means further includes alarm test means coupled to said manual reset switch to enable said audio means and cause said audio means to produce said second audible alarm signal so long as said reset switch is held actuated.

16. The apparatus of claim 13 wherein said manual reset switch is coupled to said automatic reset circuit means so that actuation of said manual reset switch, when the temperature level is above said preset level, but before said counter means cycle has expired, is operative to reset said counter means to zero to reinitiate a counting cycle of said counter means.

17. Apparatus for monitoring a variable parameter inside an enclosed unit that experiences periodic cycles of a known duration during which time the variable parameter will change, said apparatus including a sensor located within the enclosed unit for providing an electrical output signal indicative of the parameter level inside the unit, a comparator means for comparing the sensor output signal level with a preset signal level and providing a first output signal when the sensed parameter level is above the preset level and a second output signal when the sensed parameter level is below the preset level, a timer means connected to the output of the comparator means which is enabled when the comparator means produces said first output signal whereby the timer means generates a continuous chain of timing pulses and is disabled when the comparator means produces said second output signal, counter means being coupled to the timer means for counting the number of pulses generated by the timer means and producing a counter output signal when a preset count if reached, the duration of the counter means cycle being less than the duration of the periodic cycle, an audio means coupled to the output of both the timer means and the counter means and including an audio transducer means providing a first audible alert signal when the timer means is enabled and second audible alarm signal when the counter means reaches the preset count, and reset means including automatic reset curcuit means for automatically resetting the counter means to zero and disabling the timer means in response to occurrence of the second output signal of said comparator means before said counter attains said preset count thus terminating said first audible alert signal, and manual reset circuit means having a manual reset switch and holding circuit means for holding said audio means on to produce said second audible alarm signal once said preset count has been attained, notwithstanding a return of said comparator means from said second output signal to said first output signal, until said manual reset switch has been actuated.

18. The apparatus of claim 17 wherein said reset means further includes alarm test means coupled to said manual reset switch to enable said audio means and cause said audio means to produce said second audible alarm signal so long as said reset switch is held actuated.

19. The apparatus of claim 17 wherein said manual reset switch is coupled to said automatic reset circuit means so that actuation of said manual reset switch during occurrence of said first output signal is operative to reset said counter means to zero to reinitiate a counting cycle of said counter means.

* * * * *